F. B. Seeley,
Egg-Tester.
N° 57,389.    Patented Aug. 21, 1866.
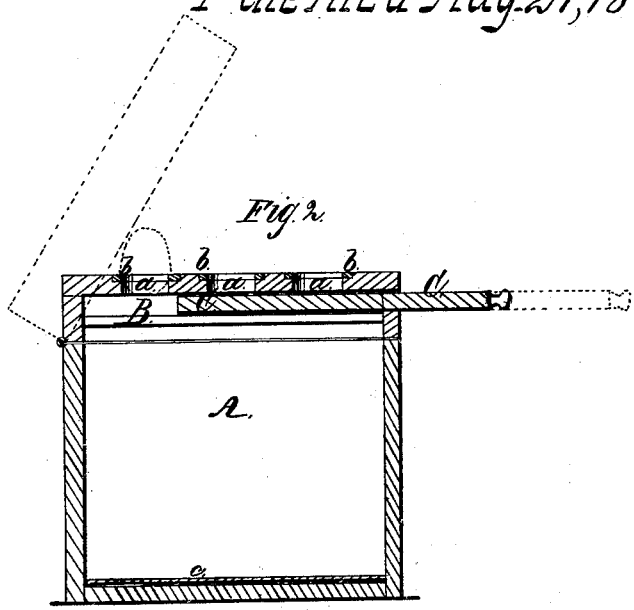
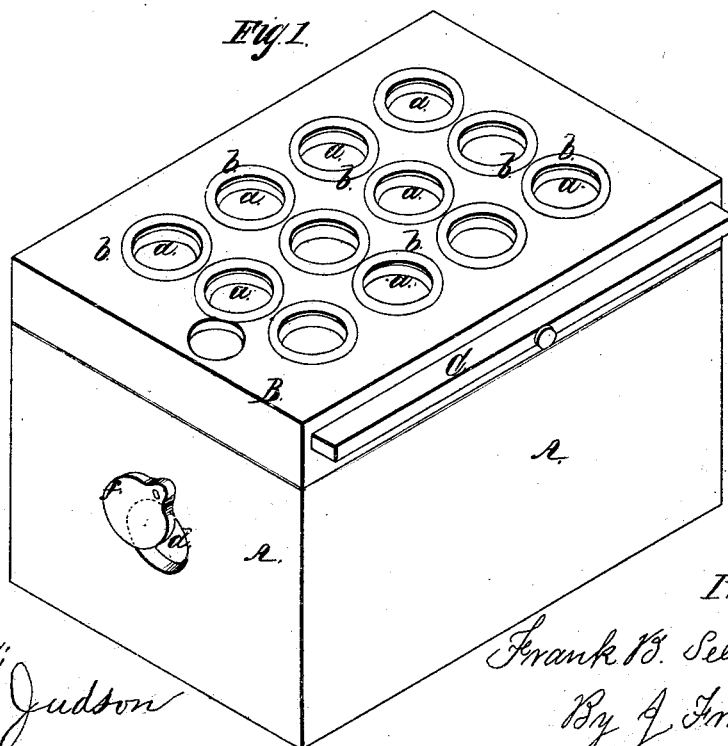
Witnesses:
Jno L Judson
Chas F Spencer
Inventor:
Frank B. Seeley
By J. Fraser & Leo
Attys.

UNITED STATES PATENT OFFICE.

FRANK B. SEELEY, OF JOHNSON'S CREEK, NEW YORK.

IMPROVEMENT IN EGG-TESTERS.

Specification forming part of Letters Patent No. 57,389, dated August 21, 1866.

*To all whom it may concern:*

Be it known that I, FRANK B. SEELEY, of Johnson's Creek, in the county of Niagara and State of New York, have invented a new and Improved Apparatus for Testing Eggs; and I do hereby declare that the following is a full and exact description thereof, reference being had to the accompanying drawings, making part of this specification.

Figure 1 is a perspective view of the apparatus. Fig. 2 is a vertical transverse section of the same.

Like letters of reference indicate corresponding parts in both figures.

My invention consists in the combination of a slide with a dark box having holes in its top to receive the eggs to be tested, and a mirror in the bottom to reflect them, so arranged that a portion of the holes may be darkened at any time when it is desirable not to use them all.

As represented in the drawings, A is an ordinary box provided with a hinged lid or cover, B, which turns back at pleasure, as indicated by the red lines, Fig. 2. If desirable, the hinged cover may be dispensed with and the top may be rigid and tight, or the same may be made to slide off horizontally instead. In the top or cover of this box are made a series of holes, *a a*, of proper size to receive and hold each an egg. I prefer to have the margin of each hole lined with a packing, *b*, made of rubber or other equivalent material, to prevent the eggs from being broken. This, however, is not absolutely essential, and may, if desired, be dispensed with. The bottom of the box is provided with a mirror or suitable reflector, *c*, placed horizontally and covering the whole bottom. Directly under the cover of the box rests a slide, C, of the same size as the cover. It is so fitted as to be drawn out at pleasure any distance, and to be adjusted at any position under the holes *a a*.

The eggs to be tested are placed in the holes *a a*, and the light passing through them, they are reflected from the mirror *c* beneath, so as to be clearly seen by the eye, looking through the cover above. If the eggs are untainted and good they look perfectly clear and transparent; if they are injured or tainted they appear dark and opaque. The degree of freshness and purity of the egg will be exactly indicated by the degree of transparency it presents. It is customary to examine eggs by looking at them through a dark tube. To examine a large number of them one by one is a considerable labor.

It is desirable to keep the interior of the box as dark as possible at all times, and in order to adapt the device to the testing of a small as well as a large number of eggs at a time, I employ the slide C to cover that portion of the holes *a* which are not used. For instance, suppose that only enough eggs are to be tested to fill one row of holes, then the slide is adjusted so as to cover all the others, and thus darken the box.

What I claim as my invention, and desire to secure by Letters Patent, is—

The combination of the slide C with the holes *a a* of the cover B and the mirror *c*, the whole arranged and operating substantially in the manner and for the purpose specified.

In witness whereof I have hereunto signed my name in the presence of two subscribing witnesses.

FRANK B. SEELEY.

Witnesses:
 F. R. MONTGOMERY,
 WM. McCANDLISH.